(12) United States Patent
Yazaki et al.

(10) Patent No.: US 7,552,808 B2
(45) Date of Patent: Jun. 30, 2009

(54) GRAVITY WHEEL OR ROLLER CONVEYOR CAPABLE OF BRAKE CONTROL WITH RESPECT TO AN OBJECT BEING TRANSPORTED

(75) Inventors: Atsuhiko Yazaki, Shizuoka (JP); Toshitsugu Mizushiri, Shizuoka (JP); Hirotoshi Kikuchi, Shizuoka (JP)

(73) Assignee: Yazaki Kako Corporation, Shizuoka-Shi (JP)

( * ) Notice: Subject to any disclaimer, the term of this patent is extended or adjusted under 35 U.S.C. 154(b) by 111 days.

(21) Appl. No.: 11/631,594

(22) PCT Filed: Mar. 25, 2005

(86) PCT No.: PCT/JP2005/005477
§ 371 (c)(1),
(2), (4) Date: Jan. 5, 2007

(87) PCT Pub. No.: WO2006/103714
PCT Pub. Date: Oct. 5, 2006

(65) Prior Publication Data
US 2007/0256908 A1    Nov. 8, 2007

(51) Int. Cl.
*B65G 13/075* (2006.01)
(52) U.S. Cl. ............................................ 193/35 A
(58) Field of Classification Search .............. 193/35 A
See application file for complete search history.

(56) References Cited

U.S. PATENT DOCUMENTS

| | | | | |
|---|---|---|---|---|
| 3,443,674 A | * | 5/1969 | Kornylak | 193/37 |
| 3,621,960 A | * | 11/1971 | Kornylak | 193/35 A |
| 3,651,911 A | * | 3/1972 | Kornylak | 193/35 A |
| 4,006,810 A | * | 2/1977 | Kornylak | 193/37 |
| 4,091,907 A | * | 5/1978 | Tabler | 193/35 A |
| 4,119,190 A | * | 10/1978 | Kornylak | 193/35 A |
| 4,168,771 A | * | 9/1979 | Krivec | 193/35 A |
| 4,379,503 A | | 4/1983 | Kornylak | |

FOREIGN PATENT DOCUMENTS

| | | |
|---|---|---|
| JP | 48-38833 | 11/1973 |
| JP | 54-380 A | 1/1979 |
| JP | 55-2822 U | 1/1980 |
| JP | 55-156109 A | 12/1980 |

(Continued)

*Primary Examiner*—Mark A Deuble
(74) *Attorney, Agent, or Firm*—Birch, Stewart, Kolasch & Birch, LLP

(57) ABSTRACT

A gravity wheel conveyor or roller conveyor is provided capable of braking for moderating and reducing the transfer speed of a relatively lightweight object being transported by using brake wheels or brake rollers, or of brake control for stopping the object being transported at a target position.

In the wheel or roller conveyor that is constructed by arranging a plurality of freely rotatable wheels 4 or rollers 10 in the transporting direction of an object, which transports an object being transported 1 by its gravitational operation, one or more selected wheels 4 or rollers 10 are constructed as brake wheels 6 or brake rollers 12 each having an outer circumferential surface onto which a brake material 7 or 11 that is soft and high in its rebound resilience is fixed so as to protrude to form a diameter larger than the outer circumferential surface of each of the wheels or rollers.

7 Claims, 11 Drawing Sheets

FOREIGN PATENT DOCUMENTS

| | | |
|---|---|---|
| JP | 57-126310 A | 8/1982 |
| JP | 62-100912 U | 6/1987 |
| JP | 43-17875 | 11/1992 |
| JP | 10-95516 A | 4/1998 |
| JP | 10-291616 A | 11/1998 |
| JP | 2001-10743 A | 1/2001 |

* cited by examiner

FIG. 3
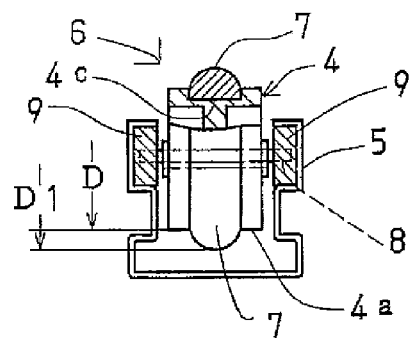
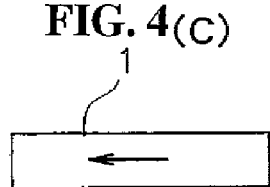
FIG. 4(C)
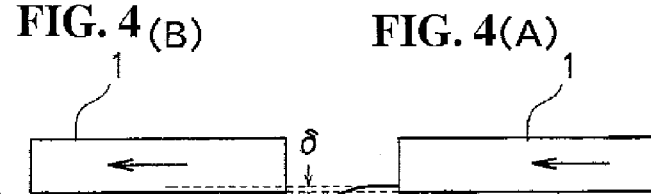
FIG. 4(B)   FIG. 4(A)
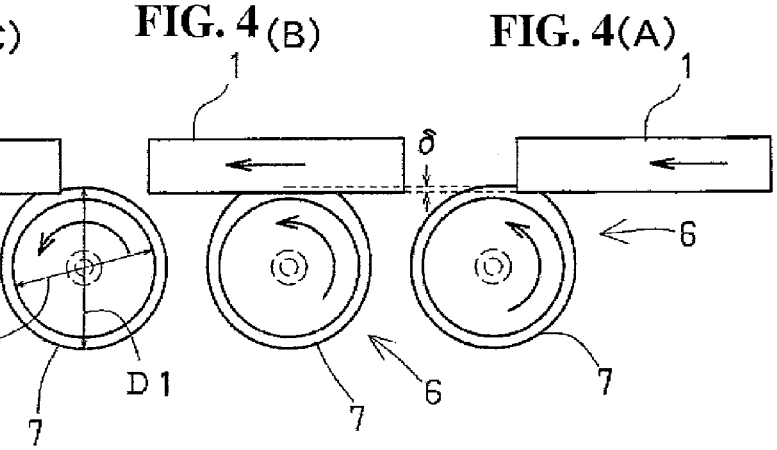

GRAVITY WHEEL OR ROLLER CONVEYOR CAPABLE OF BRAKE CONTROL WITH RESPECT TO AN OBJECT BEING TRANSPORTED

TECHNICAL FIELD

The present invention relates to the technical field of a gravity wheel conveyor or roller conveyor (hereinafter occasionally referred to as a "gravity conveyor"), that is constructed by arranging a plurality of freely rotatable wheels (rotating bodies each having a narrow outer circumferential surface width) or rollers (rotating bodies each having a wide outer circumferential surface width) in the direction in which an object is being transported, which is used in a position sloping down forward, and transfers the object being transported by gravitational operation. More specifically, the invention relates to a gravity wheel conveyor or roller conveyor in which several, or several sets of, wheels or rollers making up the conveyor are constructed as brake wheels or brake rollers that absorb the kinetic energy of the object being transported, the conveyor being capable of braking for moderating and reducing the transport speed of the object being transported, (that is relatively light in weight, from approximately 2 kg to 8 kg), by using the brake wheels or brake rollers, or capable of brake control for stopping the object being transported at a target position.

BACKGROUND ART

As illustrated in FIG. 14, the gravity wheel conveyor or roller conveyor is installed with a prescribed forward downslope by means of support bodies 2 and 3, and transports the object being transported 1 by gravitational operation. Therefore, the conveyor does not require any external motive power, has a simple construction, and can be used at low cost, so that it may be widely used. As is usual with a gravity conveyor, however, the transport speed of the object being transported 1 is gradually increased by gravitational operation, so that it is difficult to control the transport speed of such object, and to moderate partially or reduce the speed, or to stop such object precisely at a prescribed stop position.

Accordingly, when the gravity conveyor is in general use, a stopper 20 is disposed in a stop position (generally, the dead end position of the conveyor) as illustrated in FIG. 14, and the object being transported 1 is left to collide with the stopper 20 to come to rest. Therefore, the operator who stands in front of the conveyor and handles the object being transported has to lift and take out the object being transported, avoiding the stopper 20. This operation is bothersome and there is some worry that the object being transported may be accidentally dropped and damaged.

Furthermore, if the object being transported 1 collides with the stopper 20 just as the transport speed is gradually increased, the impact can be significant. Depending on the degree of the impact and the properties of the object being transported 1, such object itself may be ruined or damaged. For this reason, the gravity conveyor is not suitable for the transport of, for example, IC chips or the like, which are easily damaged by impact or vibration. The strength of an impact may also cause the conveyor frame 5 to vibrate and become insecure, so that the frame 5 must be firmly fixed in use.

In light of the foregoing, there are demands for a break control means that moderates and reduces the transport speed so that the object being transported 1 is stopped without violently colliding with a stopper 20.

In addition, there is a need for measures for preventing a collision by braking, or on the opposite side, accelerating the object being transported and thus increasing or decreasing the transport distance between such object so that an object that starts later does not smash against the object starting earlier in cases in which a large number of objects being transported are sequentially transported on the conveyor, or in cases in which a large number of objects are stopped on the conveyor and remain in the standby position.

To achieve the aforementioned objects, the brake apparatus for a gravity roller conveyor disclosed in the present patent document 1 is provided with a brake plate moved up and down by a hydraulic system in an intermediate position of a group of rollers arranged in two rows. The brake apparatus has a construction in which, if the object being transported on the conveyor requires braking (deceleration), the brake plate is pushed up and pressed against the passing object being transported to effect the braking action.

The brake apparatus for a gravity roller conveyor disclosed in the patent document 2 includes brake discs made of iron and fixed to the side faces of a roller that is rotatably supported by a shaft. Coil boxes are secured to the shaft detachedly from the respective brake discs with narrow spaces, and accommodate coils. The brake apparatus has a construction in which a braking force is given to the roller through the brake discs using a magnetic force produced by electrifying the coils.

In the gravity roller conveyor disclosed in the patent document 3, the outer circumferential surfaces of the rollers are formed of a special plastic layer having high hysteresis characteristics. The conveyor has a construction in which, on the premise that the kinetic energy absorbed by the special plastic layer that is compressed and deformed when the object being transported is loaded onto the rollers is greater than the energy that is released when the object being transported moves away from the rollers, the transport speed of the object being transported is reduced by the difference between the kinetic energy and the released energy.

The roller conveyor disclosed in the patent document 4 has a friction member disposed under a plurality of rollers. The conveyor is constructed such that the friction member is pressed against the rollers by inflating a rubber tube to apply braking to the rollers, and on the contrary, the rubber tube is deflated to cancel the braking.

Patent document 1: Examined Japanese Utility Model Publication No. Sho 43-17875
Patent document 2: Examined Japanese Patent Publication No. Sho 48-38833
Patent document 3: Unexamined Japanese Patent Publication NO. Sho 55-156109
Patent document 4: Unexamined Japanese Patent Publication No. Hei 10-291616

DISCLOSURE OF THE INVENTION

Problems to be Solved by the Invention

The construction in which the brake plate moves up and down by the hydraulic system is installed as disclosed in the patent document 1, in which the brake discs are fixed to the side faces of the roller, and the coil boxes secured to the shaft are provided to operate a magnetic braking force as disclosed in the patent document 2, or in which the rubber tube is inflated or deflated to cause the friction member to effect or cancel the braking as disclosed in the patent document 4, are ideas worth considering. Each idea has the merit that none of the gravity conveyors require any external motive power and thus can be simply constructed and used at low cost.

In this respect, the gravity roller conveyor disclosed in the patent document 3 has a construction in which the outer circumferential surfaces of the rollers are simply formed of a special plastic layer having high hysteresis characteristics. Therefore, the conveyor seems to achieve the object of moderating and braking the transport speed of the object being transported, making full use of the advantages of the gravity conveyor.

However, the patent document 3 merely explains the high hysteresis characteristics of the plastic discussed, and fails to provide specifics of the special plastic, so that the industrial applicability remains unknown. Furthermore, as far as the explanation of the high hysteresis characteristics is concerned, the explanation virtually implies that the special plastic layer is slow in restoration after being compressed and deformed by the object being transported. Apparently, if the rotational speed of the rollers is so fast as to be greater than the restoration (in the case of high-speed transport), there is not enough time for restoration, and the operation and advantages of braking the transport speed of the object being transported cannot be expected. In addition, the description of FIG. 9, provided from line 9 to 14 in the lower left column on page 2 of the same publication, refers to the application of extremely heavy weight as it says that live loads in case examples are 300 kg, 50 kg and 100 kg. It would appear that the heavier the live load is, the lower the speed of control is. This is recognized as operation and advantage resulting from the characteristics and performance of the special plastic layer having high hysteresis characteristics. The special plastic is therefore not applicable at all to the brake control of an object being transported that is as light in weight as from 2 kg to an approximate maximum of 8 kg, which is an intention of the present invention.

An object of the present invention consists in providing a gravity wheel conveyor or roller conveyor suitable for transporting an object that is as light as 2 kg to approximately 8 kg, the conveyor being capable of brake control for moderating and reducing transport speed by kinetic energy absorption of a brake wheel or brake roller, and for decelerating the object being transported in the middle of transport or stopping such object at a prescribed stop position without spoiling the gravity conveyor's advantage of requiring no external motive power, being simply constructed and being used at low cost.

Means for Solving the Problems

As means for solving the problems described above in the conventional technology, in a gravity wheel or roller conveyor capable of brake control of an object being transported according to the invention, a plurality of freely rotatable wheels 4 or rollers 10 are arranged in the transporting direction of an object, and the object 1 is transported by gravitational operation. The conveyor is characterized in that one or more selected wheels 4 or rollers 10 are constructed as brake wheels 6 or brake rollers 12 each having an outer circumferential surface onto which a brake material 7 or 11 that is soft and high in rebound resilience is fixed so as to protrude to form a diameter larger than the outer circumferential surface of each of the wheels or rollers.

In a gravity wheel or roller conveyor capable of brake control of an object being transported, according to the invention, a plurality of freely rotatable wheels 4 or rollers 10 are arranged in the transporting direction of an object, and the object is transported by gravitational operation. The conveyor is characterized in that at least two or more selected adjacent wheels 4 or rollers 10 are connected together by winding a belt-like brake material 17 around them to be constructed as a set of brake wheels or brake rollers 15, 16 or 18.

The conveyor may be characterized in that the entire belt-like brake material 17 or an outer circumferential portion thereof is formed of a material that is soft and high in rebound resilience, and the belt-like brake material 17 is wound around the wheels or rollers so as to protrude to form a diameter, larger than the outer circumferential surfaces of the wheels 4 or rollers 10.

The conveyor may be characterized in that the set of brake wheels or rollers 16 is constructed by providing each of the wheels 4 or rollers 10 with a rotation-transmitting portion 4b or 40b having a diameter smaller than the original outer circumferential surface thereof, winding one end of the belt-like brake material 17 around the transmitting portion 4b or 40b having the smaller diameter, and winding the other end of the belt-like brake member 17 around the original outer circumferential surface portion of an adjacent wheel 4 or roller 10 in such a protruding position as to form a diameter larger than the outer circumferential surface thereof.

The conveyor may be characterized in that the set of brake wheels or rollers 18 is constructed by providing each of the wheels 4 or rollers 10 with a rotation-transmitting portion 4b or 40b having a diameter smaller than an original outer circumferential surface thereof, and winding the belt-like brake material 17 around rotation-transmitting portions 4b or 40b having smaller diameters formed in two adjacent wheels 4 or rollers 10 so as not to protrude from original outer circumferential surfaces of the wheels or rollers.

The conveyor may be characterized in that a cross-sectional shape of the brake material 7 or belt-like brake material 17 is a circle, ellipse, rectangle, polygon, trapezoid, triangle, a half form or indented form of one of these shapes, or a hollow form of one of these shapes.

The conveyor may be characterized in that the brake material 7 or the belt-like brake material 17 has a bristle structure.

The conveyor may be characterized in that the brake material 7 or the belt-like brake material 17 is formed into the shape of a ring having width corresponding to part of width of the outer circumferential surface of the wheel 4 or roller 10.

The conveyor may be characterized in that a ring-shaped groove is formed in a widthwise portion of the outer circumferential surface of the wheel 4 or roller 10, and the brake material 7 or the belt-like brake material 17 is fitted in such groove.

The conveyor may be characterized in that the brake material 7 or the belt-like brake material 17 is made of an elastomeric material having a rubber hardness HS (JIS A) of 90 degree or less and a rebound resilience (JIS K7311) of 85 percent or less.

In a gravity wheel or roller conveyor capable of brake control of an object being transported according to the invention, a plurality of freely rotatable wheels 4 or rollers 10 are arranged in a transporting direction of an object, and such object 1 is transported by gravitational operation. The conveyor is characterized in that one or more selected wheels 4 or rollers 10 are molded as brake wheels or brake rollers from rubber or plastic material that is soft and high in rebound resilience.

The conveyor may be characterized in that the brake wheels or the brake rollers are molded from an elastomeric material having a rubber hardness HS (JIS A) of 90 degree or less and a rebound resilience (JIS K7311) of 85 percent or less.

The conveyor may be characterized in that the wheel 4 or the roller 10 and the brake material 7 or the belt-like brake material 17 are made of a low resistance material having a volume resistivity of $10^{12}$ or less, selected among rubbers or plastics.

Advantages of the Invention

The gravity wheel conveyor or roller conveyor according to the present invention is simply constructed by arranging at least one or more brake wheels 6 or brake rollers 12 on which a brake material 7 or 11 that is soft and high in rebound resilience is fixed onto the outer circumferential surface of each of the wheels 4 or rollers 10 so as to protrude to form a diameter ($D_1$), larger than the outer circumferential surface 4a (external diameter D) of each of the wheels of rollers, or by arranging the set of brake wheels or rollers 15, 16 or 18 in which two or more adjacent wheels 4 or rollers 10 are connected together using a belt-like brake material 17, or by arranging the brake wheels or brake rollers molded from rubber or a plastic material that is soft and high in rebound resilience, thus maintaining the gravity conveyor's advantage of requiring no external motive power and of being capable of being used at low cost.

In other words, the transport speed of the object being transported 1 is reduced and braked by the kinetic energy-absorbing operation of the brake wheels or brake rollers themselves or that of the brake material 7 fitted onto the respective outer circumferential surfaces of the wheels or rollers or the friction resistance of the brake wheels or brake rollers themselves or that of the belt-like brake material. This makes it possible to control a reduction in the transport speed of the object being transported 1 or the braking for stopping the object being transported 1 at the prescribed stop position. Accordingly, the stopper (reference numeral 20 of FIG. 14) for stopping the object being transported 1 is not particularly required.

The operator who stands in front of the conveyor and handles the object being transported 1 does not have to lift and take out the object being transported 1, avoiding the stopper, and can work without difficulty. Moreover, there is no fear that the object being transported 1 may collide with the stopper and become damaged. In addition, there is no fear of a vibration in which the conveyor is bounced due to the impact strength created at the time of a collision of the object being transported 1 with the stopper. Thus, there is no need for special arrangements for securing the conveyor, and the conveyor can be conveniently used. It is possible to transport an object that is as light as approximately 2 kg to 8 kg in a quiet state with no generation of vibration or impact, which makes the conveyor suitable for transporting objects easily affected by such vibrations and impacts.

In the gravity wheel conveyor or roller conveyor according to the invention, when the object being transported 1 is loaded onto the brake wheels 6 or the brake rollers 12, the brake materials 7 or 11 that are soft and high in rebound resilience are flexibly and resiliently deformed and absorb the kinetic energy generated at the time of the loading.

When the object being transported 1 moves away from the brake wheels 6 or the brake rollers 12, the brake materials 7 or 11 release the energy saved during the deformation and are restored to their original forms. However, the object being transported 1 is rectilinearly transported in a tangential direction, whereas the brake materials 7 or 11 are rotated and detached away together with the wheels 4 or the rollers 10. As a result, the released energy has an extremely low degree of influence upon the rectilinear transport of the object being transported 1, and the absorption amount of the kinetic energy is much greater. Difference between the absorption amount of the kinetic energy and the degree of influence of the energy that releases the kinetic energy with respect to the transport of the object being transported 1 emerges as operation and advantages of moderating and braking the transport speed of the object being transported 1. The operation and advantages are not influenced by the rate of the transport speed of the object being transported 1.

If a necessary number of the brake wheels 6 or the brake rollers 12, equal to a velocity vector to which the transfer speed of the object being transported 1 requires to be moderated and reduced, are disposed in a place where the transport speed of the object being transported 1 is required to be moderated and reduced or in a place where the object being transported is required to be stopped, in the travel (effective transport length) of the conveyor that transports the object being transported 1, it is possible to reduce the transport speed of the object being transported 1 to a desired value or to accomplish the brake control for stopping the object being transported 1 at a prescribed stop position.

When the brake wheels or brake rollers in which the wheels 4 or the rollers 10 themselves are molded from rubber or a plastic material that is soft and high in rebound resilience are used, an identical operation, with the same advantages, can be accomplished.

When a set of brake wheels or brake rollers 15, 16 or 18 in which at least two adjacent wheels 4 or rollers 10 are connected together by the belt-like brake material 17, firstly, the friction resistance created between the belt-like brake material 17 that is wound with moderate tension and the wheels 4 or rollers 10 provides an operation and the advantages of moderating and braking the transport speed of the object 1 that is loaded.

Secondly, in the case of a construction in which the belt-like brake material 17 that comprises the set of brake wheels or brake rollers 15 and 16 is soft and high in rebound resilience, and the belt-like brake material 17 protrudes to form a diameter ($D_1$) larger than the outer circumferential surfaces of the wheels 4 or rollers 10, when the object being transported 1 is loaded onto the set of brake wheels or brake rollers 15 and 16, the brake materials that are soft and high in rebound resilience are flexibly and resiliently deformed and absorb the kinetic energy created at the time of the loading in the same manner. On the other hand, when the object being transported 1 moves away from the set of brake wheels or brake rollers 15 and 16, the brake materials release the energy stored by the deformation and are restored to their original forms. However, the object being transported 1 is rectilinearly transported, whereas the brake materials are rotated and detached away together with the wheels 4 or the rollers 10. As a result, the amount of the released energy with respect to the rectilinear transport of the object being transported 1 is extremely small, and the absorption amount of the kinetic energy is much greater. There are advantages to moderating and braking the transport speed of the object being transported with the difference between the absorption amount of the kinetic energy and the released energy with respect to the object being transported 1.

Thirdly, when there is a set of brake wheels or rollers 16 having a construction in which each of the wheels 4 or 40 or rollers 10 is provided with a rotation-transmitting portion 40b having a diameter $d_1$ smaller than an original outer circumferential surface thereof, and one end of the belt-like brake material 17 is wound around the rotation-transmitting portion 40b having the smaller diameter, and the other end is wound around the original outer circumferential surface portion of the wheel 4 or roller 10 in such a protruding position as to form a diameter larger than the outer circumferential surface thereof, a difference of rotational speed is generated in the wheels 4 or rollers 10 and difference of linear velocity is generated in the belt-like brake materials 17. Accordingly, the transport speed of the object that is to be loaded thereon or that is to be transported is increased or decreased.

Especially, as shown in FIG. 10, in the case of a construction in which a compound type wheel 40 (or roller) provided with a rotation-transmitting portion having a large diameter in an original outer circumferential surface portion thereof and a rotation-transmitting portion having a diameter smaller than the original circumferential surface and two wheels 4 and 4 located in front and in the rear of the wheel 40 are connected together by the larger diameter portions or by the smaller diameter portions, or connected together by the rotation smaller diameter portion 40b and the larger diameter portion using the belt-like brake material 17, a slip unavoidably occurs between the rotation smaller diameter portion 40b and the belt-like brake material 17 wound therearound. As a result, the transport speed of the object being transported 1 is reduced or increased, which makes it possible to have brake control in various ways.

Consequently, if a necessary number of sets of brake wheels or brake rollers 15, 16 and 18 are disposed in a place where the transport speed of the object being transported is required to be moderated and reduced, or in a place where the object being transported is required to be stopped, in the travel (effective transport length) on the conveyor that transports the object being transported 1, it is possible to freely moderate and reduce, or increase the transport speed of the object being transported 1, or carry out the brake control for stopping the object being transported 1 at a target stop position.

BEST MODE OF CARRYING OUT THE INVENTION

In a wheel conveyor or roller conveyor having a construction in which a plurality of freely rotatable wheels 4 or rollers 10 are arranged in the transporting direction of an object, and the object being transported 1 is transported by gravitational operation, one or more selected wheels 4 or rollers 10 are constructed as brake wheels 6 or brake rollers 12, each having an outer circumferential surface onto which a brake material 7 that is soft and high in rebound resilience is fixed so as to protrude to form a diameter larger than the outer circumferential surface of each of the wheels 4 or rollers 10.

Alternatively, there are arranged at least one or more sets of brake wheels or brake rollers 15, 16 and 18 in which at least two or more selected adjacent wheels 4 or rollers 10 are connected together by winding a belt-like brake material 17 therearound.

Basically, the belt-like brake material 17 is made of a material that is soft and high in rebound resilience, and is wound around the wheels 4 or the rollers 10 so as to protrude to form a diameter ($D_1$) larger than the outer circumferential surfaces of the wheels 4 or rollers 10.

The set of brake wheels or brake rollers 18 may be constructed as the set of brake wheels or brake rollers 16 by providing each of the wheels 4 or rollers 10 with a rotation-transmitting portion 40b with a diameter ($d_1$) smaller than an original outer circumferential surface thereof, winding one end of the belt-like brake material 17 around the rotation-transmitting portion 40b with the smaller diameter that is formed in each of the wheels 4 or rollers 10, and winding the other end of the belt-like brake material 17 around the adjacent wheel 4 or roller 10 in a protruding position so as to form a diameter larger than the original outer circumferential surface thereof (FIG. 10).

To put it in an extreme way, it is possible to construct the set of brake wheels or brake rollers 18 (FIG. 8) by providing each of the wheels 4 or rollers 10 with the rotation-transmitting portion 4b having the diameter smaller than the original outer circumferential surface thereof, and winding the belt-like brake material 17 around the rotation-transmitting portion 4b having the smaller diameter which is formed in each of two adjacent wheels 4 or rollers 10 so as not to protrude as compared to the original outer circumferential surface of each of the wheels 4 or rollers 10.

In addition, it is possible to construct the wheel conveyor or roller conveyor using brake wheels or brake rollers whose wheels 4 or rollers 10 themselves are made of rubber or plastic material that is soft and high in rebound resilience.

Embodiment 1

The present invention will be explained below with reference to illustrated embodiments.

First, FIG. 1 shows an embodiment of a gravity wheel conveyor according to the invention when in use. FIG. 2A is a perspective view of the conveyor, partially broken away. FIG. 2B shows the appearance of a brake wheel 6. In order to transport an object being transported 1 by gravitational operation, the conveyor is so installed as to slope down forward at an angle θ in a leftward direction and is supported by support bodies 2 and 3. The angle θ is generally determined to be approximately 2 degrees to approximately 5 degrees.

The wheel conveyor shown in FIG. 1 has a construction in which a plurality of freely rotatable wheels 4 . . . are arranged at proper intervals in the longitudinal direction of the frame material 5, that is, in the transporting direction of the object being transported 1. Each of the wheels 4 is integrally molded as an injection-molded object that is generally made of synthetic resin or hard rubber having a high friction coefficient on the premise of transfer of a lightweight object that is approximately 2 kg to approximately 8 kg in weight, which is an object of the present invention. Each of the wheels 4 has an external diameter D of about 30 mm to about 50 mm, and an outer circumferential surface of about 20 mm to about 30 mm in width. A pitch between the wheels (distance P between axes) is approximately 31 mm when the external diameter D of each of the wheels 4 is 30 mm.

Constructed as a brake wheel 6 is one or more wheels located in an arbitrarily selected place in the wheel conveyor, that is to say, in the case of the example shown in FIG. 1, three wheels (the number is not limited to three) located in a place a1 at a dead end where the transport of the object being transported 1 is stopped, and two wheels (the number is not limited to two) located in a place a2 where a transport speed of the object being transported 1 is required to be moderated and reduced in the middle of the transport travel (effective transport length) of the conveyor.

A specific construction of the brake wheel 6 is shown in FIGS. 2A, 2B and 3. The brake wheel 6 has a construction in which a brake material 7 formed by molding a material that is soft and high in rebound resilience, which is rubber or plastic material, such as an elastomeric material having a rubber hardness HS (JIS A) of 90 degree or less and rebound resilience (JIS K7311) of 85 percent or less, into a ring-like shape is fixed onto an outer circumferential surface 4a of another ordinary wheel 4 so as to have a thickness of at least 0.5 mm or more, preferably approximately 3 mm, and protrude from the outer circumferential surface 4a of the wheel 4 to form a larger diameter ($D_1$).

In the fitting structure of the brake material 7, as illustrated in FIG. 3, a groove portion 4c is formed in the outer circumferential surface 4a of the wheel 4, and the ring-like brake material 7 molded into a semicircular shape in section is forced into the groove portion 4c, to thereby construct the brake wheel 6.

A shaft 8 made of metal is pierced through a boss hole located in a central portion of the ordinary wheel 4 and brake wheel 6. Elongate bar-like support materials 9 molded from vibration-proof rubber are attached to respective end portions of the shaft 8. The support materials 9 are inserted into right and left inward groove portions of a frame material 5 as supports, and the wheel 4 and the brake wheel 6 are thus installed in the frame material 5, thereby carrying out fabrication of the wheel conveyor. The support materials 9 molded from vibration-proof rubber are provided for the purpose of maintaining the distance between the wheel 4 and the brake wheel 6, blocking the propagation of vibration, and facilitating the fitting operation with respect to the frame material 5.

The operation and advantages of the brake wheel 6 will be explained below with reference to FIG. 4.

FIG. 4A shows a state in which the object being transported 1 is loaded onto the brake wheel 6. Upon receipt of the weight of the object being transported 1 that has been loaded, the brake material 7 that is soft and high in rebound resilience is flexibly and resiliently compressed and deformed, thus sinking the object being transported 1 by a deformation amount 6 as shown in FIG. 4B. Therefore, the brake material 7 absorbs the kinetic energy of the object being transported 1 corresponding to the deformation amount 6 obtained by the sinking. When the object being transported 1 is detached away from the brake wheel 6 as shown in FIG. 4C, the brake material 7 having high rebound resilience releases the energy stored by the compression and deformation and is rapidly restored to its original form. At this point, the object being transported 1 rectilinearly moves leftward as shown in FIG. 4C, and the brake material 7 rotates with the wheel 4 to move away. As a result, most of the released energy runs to waste and has little influence upon the rectilinear transport of the object being transported 1.

Consequently, the transport speed of the object being transported 1 is moderated and reduced by the difference of the energy amount, roughly the kinetic energy that has been absorbed when the object being transported 1 is loaded onto the brake wheel 6.

The level of operation and the advantages in which the brake wheel 6 moderates and reduces the transport speed of the object being transported 1 corresponds to the kinetic energy amount absorbed by the brake material 7, which leads to the conclusion that the kinetic energy amount should be properly determined in consideration of the number of the brake wheels 6 used in the wheel conveyor, places in which the brake wheels 6 are to be used (see places a1 and a2 in FIG. 1), a setting angle θ of the wheel conveyor, the mass of the object being transported 1, and the like.

Hereinafter, specific results of actual measurement will be explained.

The wheel conveyor used in an actual measurement test had a construction in which seven brake wheels 6 were disposed in the place a1 at the dead end in the construction of FIG. 1. Materials and properties of the brake material 7 were a silicon gel having a needle penetration of 55 and a low elastic rubber having a rubber hardness HS32. The object being transported 1 was 3 kg in weight and 400 mm in length L. A rolling friction coefficient of each wheel was 0.017. Each wheel had an external diameter of 30 mm and a wheel pitch of 31 mm. An inclination angle θ of the wheel conveyor was changed from 2.15 degrees to 2.43 degrees to 2.72 degrees, and a transport distance K from a starting point S (distance to a stop position) in a wheel conveyor whose effective transport length was 2200 mm was measured. The result of the actual measurement is shown in [TABLE 1] below.

TABLE 1

| | Material of the brake material and the transport distance K | |
|---|---|---|
| Inclination angle θ | Silicon gel having a needle penetration of 55 | Low-resilience rubber of rubber hardness HS32 |
| 2.15 | 1780 mm | 1710 mm |
| 2.43 | 2000 mm | 1830 mm |
| 2.72 | Unmeasurable | 2100 mm |

As is apparent from TABLE 1, it was confirmed that the object being transported 1 could be stopped at a position before the dead end of the conveyor by the braking operation of the brake wheels 6, and that there was effective moderation and reduction of the transport speed.

In other words, it should be understood that if the design is properly prepared in consideration of the number of the brake wheels 6 used in the wheel conveyor, places in which the brake wheels 6 are to be used (see the places a1 and a2 in FIG. 1), a setting angle θ of the wheel conveyor, the mass of the object being transported 1, and the like, it is possible, for example, to moderate and reduce the transport speed of the object being transported 1 in the place a2 located in the middle of the travel of the wheel conveyor of FIG. 1 and to design braking for noiselessly stopping the object being transported 1 at a target position in the place a1 that is an end point of the conveyor.

As a result, a stopper (reference numeral 20 in FIG. 14) that had been indispensable in the conventional technology becomes dispensable. Consequently, there is no fear that the object being transported may crash into the stopper and be damaged. Moreover, the operator who stands in front of the conveyor and handles the object being transported 1 does not have to lift and take out the object being transported 1, avoiding the stopper. It is then possible to take out the object being transported 1 smoothly along a downslope of the conveyor, and the operation is carried out without difficulty. In addition, vibrations in which the conveyor bounces due to impact with the stopper is eliminated, so that the conveyor does not have to be particularly fastened.

As mentioned above, the brake wheel 6 functions properly as long as the brake material 7 moderately protrudes from the outer circumferential surface of the wheel and is flexibly and resiliently compressed and deformed upon receipt of the weight of the object 1 that is loaded to moderately sink the object 1. The material of the brake material 7, a protruding amount of the brake material 7 with respect to the outer circumferential surface of the wheel, and the like, are properly selected and designed in consideration of the aforementioned.

Materials applicable to the brake material 7 are listed in [TABLE 2] below.

TABLE 2

| Material | Rubber hardness |
|---|---|
| Silicon rubber | HS70 |
| Nitrile rubber | HS90 |
| Low-resilience rubber | HS32 |
| Silicon gel | Needle penetration of 55 |

Rebound resilience of each of the above materials is 85 percent or less.

In addition to the case in which the brake material 7 has a semicircular cross section as shown in FIG. 3, the construction of the brake wheel 6 can be embodied in expectation of similar operation and advantages when the cross section of the brake material 7 is in the shape of a complete circle or oval, when the brake material 7 has a rectangular cross section as shown in FIG. 5A, when the brake material 7 has a triangular cross section as shown in FIG. 5B, when the brake material 7 has a cross section creased in the middle as shown in FIG. 5C, when the brake material 7 is constructed by so-called bristling fibers, such as Tetoron and polyester that are soft and high in rebound resilience to a durable base material as shown in FIG. 5D, or when the brake material 7 has a cross section having a hollow construction as shown in FIG. 5E (including hollow constructions having other cross-sectional shapes).

[TABLE 3] shows a result of actual measurement when bristling is applied to the brake material 7 of the brake wheel 6 on actual measurement conditions described in the above descriptions from line 25 on page 20 to line 1 on page 22.

The material of the bristles was polyester. Each bristle was 5 mm long and has a thickness of 0.01 mm. The protruding length of bristles from the outer circumferential surface of the wheel is 4 mm, and the bristles have a bristle density of 500 bristles per $cm^2$.

TABLE 3

| Inclination angle θ | Transport distance K of the brake wheel applied with bristling |
|---|---|
| 2.15 | 1645 mm |
| 2.43 | 1743 mm |
| 2.72 | 1880 mm |
| 3.00 | 1990 mm |

When [TABLE 3] is compared to [TABLE 1], it is evident that the brake wheel applied with the bristling brings about more excellent braking effects for moderating and reducing the transport speed of the object being transported 1.

Embodiment 2

FIG. 6 shows an embodiment of a roller conveyor provided with two brake rollers 12 in a dead end portion.

Each of the brake rollers of this embodiment has a construction in which a brake material 11 that is soft and high in rebound resilience and has a rather broad width is fitted to the outer circumferential surface of another ordinary roller 10 in the roller conveyor in a position forming such a larger diameter as to protrude from the outer circumferential surface of the corresponding roller in a length of at least 0.5 mm or more. The fitting structure and the specific construction of the brake material 11 are the same as those of the brake wheel 6 of embodiment 1.

The ordinary rollers 10 and the brake rollers 12 are supported by rotary shafts 13 rotatably interfitted in respective shaft bores formed in a conveyor frame 9, thus constructing the roller conveyor. Needless to add, the places where the brake rollers 12 are installed and the number thereof are determined in the same manner as in the case of the wheel conveyor described in the embodiment 1. That is to say, a necessary number of the brake rollers 12 are installed in places where the transport speed of the object being transported 1 is required to be moderated and reduced, and where the object being transported 1 is required to be stopped noiselessly (see 1a and a2 in FIG. 1).

Although a braking effect of the brake rollers 12 was not actually measured, it can be extrapolated that the brake rollers 12 have operation and advantages similar to those of the brake wheels.

Embodiment 3

FIG. 7 shows an embodiment of the invention, that is, a conveyor in which there are disposed a set of brake wheels 15 and a set of brake wheels 16 connected together by winding the belt-like brake material 17 around two arbitrarily selected adjacent wheels 4, 4 (or rollers, as is the case hereinafter), and there are also arranged the brake wheels 6 of the embodiment 1. A form of each set of brake wheels 15 and 16 as viewed in a cross-sectional direction is substantially similar to the forms shown in FIG. 3 or 5.

The Operation and advantages provided by the sets of brake wheels 15 or 16 in which the two adjacent wheels 4,4 are connected together by using the belt-like brake material 17 will be explained firstly with reference to an embodiment shown in FIG. 8.

FIG. 8 shows an embodiment of the invention; that is, an example of an extreme construction of a set of brake wheels, in which the belt does not contact the object being transported 1.

In the set of brake wheels 18 according to the present embodiment, a rotation-transmitting portion 4b (a so-called pulley portion) having a diameter (d) that is a slightly smaller than the outer circumferential surface 4a (external diameter D) is formed in the central portion of the outer circumferential surface 4a of the wheel 4 (or roller) or in the side portion of the wheel. Two adjacent wheels 4, 4 are connected together by winding the belt-like brake material 17 around the rotation-transmitting portion 4b having the smaller diameter. In the case of the present embodiment, an outline surface of the belt-like brake material 17 is formed not to protrude (in a sunk position) from the original outer circumferential surface 4a (external diameter D) of the wheel 4, that is, formed into a diameter $D_0$ smaller than D. Therefore, the object 1 transported on the wheels 4 ... of the conveyor does not contact the belt-like brake material 17.

Unlike the sets of other brake wheels 15 and 16, the belt-like brake material 17 of the present embodiment does not require the belt to be formed into a brake material that absorbs the kinetic energy of the object being transported 1, and functions properly as long as it has a construction of a general motive power transmission belt.

The belt-like brake material 17 wound around the rotation-transmitting portions 4b, 4b of two wheels 4, 4 has the advantage of moderating and reducing the transport speed due to friction resistance produced between the belt-like brake material 17 and the wheels 4, which absorbs the kinetic energy of the object being transported 1. As is well known, a degree of the friction resistance between the belt-like brake material 17 and the wheels 4 is determined not only by a friction coefficient of each material but also by a degree of initial tension that is provided beforehand to the belt-like brake material 17. Consequently, if such factors are properly designed, the degree of the advantage of moderating and reducing the transport speed of the object being transported 1 can be properly adjusted and determined.

In the case of the present embodiment, the object being transported 1 directly contacts the outer circumferential surface 4a of the wheel 4. Therefore it is desirable that a pitch $P_1$ between two adjacent wheels 4, 4 be set half or less, or one third or less of the entire length L of the object being transported 1 so that the object being transported 1 does not bounce up and down each time it is loaded onto a subsequent wheel 4 or moves away from a passing wheel 4. For example, if the external diameter of each wheel is 30 mm, the pitch $P_1$ is set to be about 31 mm. The material of the wheels 4 is preferably rubber having elasticity, or the like.

FIG. 9 shows an embodiment of the brake wheels 15 illustrated in FIG. 7. The entire belt-like brake material 17 or at least the outer circumferential portion thereof which receives the object being transported 1 is constructed of a brake material made up of a material that is soft and has a rebound resilience of 85 percent or less. In view of a function of the belt transmission, the belt-like brake material 17 is formed as one integral object by selecting a material having high tensile strength among those listed in TABLE 2 as suitable for the brake material. Alternatively, the belt-like brake material 17 is formed in a cross-sectional construction as shown in FIG. 3 or FIGS. 5A to 5E by superposing a brake material that is soft and high in rebound resilience upon a surface of a durable belt base material or by bristling a textile material made up of a material having high rebound resilience. The belt-like brake material 17 is wound around two wheels 4, 4 to connect the wheels together such that the outline surface of the belt-like brake material 17 protrudes to form the diameter $D_1$ larger than the outer circumferential surface (external diameter D) of the wheel 4 (or roller).

In the case of the set of brake wheels 15 according to the present embodiment, friction resistance is generated between the wheels 4 and the belt-like brake material 17, thus providing the operation and advantages of moderating and reducing the transport speed of the object being transported 1 in the same manner as in the embodiment shown in FIG. 8.

Furthermore, as in the brake wheel 6 of the embodiment 1, when the object being transported 1 is loaded onto the set of brake wheels 15 as shown by the letter R in FIG. 9, the brake material 17 that is soft and high in rebound resilience receives the weight of the object 1 that has been loaded, and is flexibly and resiliently compressed and deformed to sink the object being transported 1, thereby absorbing the kinetic energy of the object being transported 1 by an amount corresponding to a deformation amount δ. On the other hand, when the object being transported 1 moves away from the set of brake wheels 15 as shown by the letter S, the brake material 17 having high rebound resilience releases the energy stored by the compression and deformation and is restored to its original form. However, the object being transported 1 rectilinearly moves leftward, and the belt-like brake material 17 rotates together with the wheels, so that the released energy is not strong enough to encourage the rectilinear transport of the object being transported 1. In other words, as described in the embodiment 1, the difference between the absorbed kinetic energy amount and the released energy provides the effect of moderating and reducing the transfer speed of the object being transported 1.

Specific results of actual measurement will be described below.

A wheel conveyor used in the actual measurement has a construction in which seven sets of brake wheels 15 are disposed in the place a1 located at the dead end as in the embodiment in FIG. 1. Materials and properties of the brake material in the belt-like brake material 17 are silicon rubber having a rubber hardness HS of 70 degree and nitrile rubber having a rubber hardness HS of 90 degree. The object being transported 1 was 3 kg in weight, and 400 mm in length L. A rolling friction coefficient of each wheel was 0.017, and an external diameter thereof was 30 mm. A pitch between the wheels was 31 mm. An inclination angle θ of the wheel conveyor was changed from 2.15 degree to 2.43 degree to 2.72 degree to 3.0 degree, and the transport distance K from the starting point S (distance to a position where the object being transported 1 is stopped) in the wheel conveyor whose effective transport length was 2200 mm was measured. Results of the actual measurement are shown in [TABLE 4] below.

TABLE 4

| | Material of the brake material and the transport distance K | |
|---|---|---|
| Angle of inclination θ | Silicon rubber having a rubber hardness HS of 70 | Nitrile rubber having a rubber hardness HS of 32 |
| 2.15 | 1610 mm | 1620 mm |
| 2.43 | 1655 mm | 1660 mm |
| 2.72 | 1703 mm | 1720 mm |
| 3.00 | 1750 mm | 1770 mm |

When [TABLE 4] is compared with [TABLE 1] and [TABLE 3], as is easily recognizable, it was confirmed that the set of brake wheels 15 using the belt-like brake material 17 was capable of stopping the object being transported 1 at a position long before the dead end of the conveyor and provided great effectiveness of moderating and reducing the transport speed of the object being transported 1.

Conceivably, a reason for this is that, as described above, the set of brake wheels 15 moderates and reduces the transport speed of the object being transported 1 due to the effect obtained by combining the friction resistance produced between the wheels 4 and the belt-like brake material 17 and an amount in which the belt-like brake material 17 absorbs the kinetic energy of the object being transported 1.

Illustrated in FIG. 10 is a conveyor in which the set of brake wheels 15, the set of brake wheels 16, shown in FIG. 7, and the brake wheel 6 of the embodiment 1 are assembled.

In the case of the embodiment shown in FIG. 10, the set of brake wheels 15 and the set of brake wheels 16 have a construction in which a compound type wheel 40 located in the middle of the sets is connected to both the sets with belts in the same manner, to thereby connect three adjacent wheels 4 with two belt-like brake materials 17.

Although the compound type wheel 40 basically has a construction common with the above-mentioned ordinary wheel 4 as illustrated in FIG. 11, a groove 40c functioning as a pulley portion is formed in a central portion of the outer circumferential surface of the wheel 40, and one belt-like brake material 17 is wound therearound. Moreover, in one side portion of the wheel 40, there is formed a rotation-transmitting portion 40b (so-called pulley portion) of a diameter $d_1$ smaller than the groove 40c in addition to the original outer circumferential surface 40a (external diameter D) of the wheel, and the other belt-like brake material 17 is wound therearound. Additionally, as is clear from FIG. 10, an effective diameter of the rotation-transmitting portion 40b having the smaller diameter $d_1$ means the size in which the outline surface of the belt-like brake material 17 wound around the rotation-transmitting portion 40b having the smaller diameter $d_1$ has a diameter smaller than the original outer circumferential surface 40a (external diameter D) of the wheel and does not contact the object being transported 1.

In the embodiment shown in FIG. 10, the three adjacent wheels 4 are connected together by the two belt-like brake materials 17, 17 with the compound type wheel 40, which is positioned in the middle and constructed as described above, connected in common.

The compound type wheel 40 and the wheel 4 on the right are connected to each other by so-called parallel stretching such that the outline surface of the belt-like brake 17 protrudes to form a diameter ($D_1$) larger than the original outer circumferential surfaces 40a of both the wheels. As to the compound type wheel 40 and the left-hand wheel 4, however, one end of the belt-like brake material 17 is wound around the rotation-transmitting portion 40b having the smaller diameter $d_1$ formed in the compound type wheel 40, and the other end around the left-hand wheel 4 such that the outline surface of the belt-like brake material 17 protrudes to form a diameter ($D_1$) larger than the original outer circumferential surface (outline D) of the wheel 4. Consequently, a linear velocity of the belt-like brake material 17 of the set 16 is controlled by a rotational peripheral speed of the rotation-transmitting portion 40b with the smaller diameter $d_1$, resulting in a deceleration-type connection that reduces a rotational frequency of the wheel 4 on the left.

For that reason, when the object being transported 1 that advances in a right-to-left direction in FIG. 10 is loaded onto the set of brake wheels 15 formed by the parallel stretching as shown by the letter U, as described with reference to FIG. 9, the brake material 17 that is soft and high in rebound resilience is flexibly and resiliently compressed and deformed upon receipt of weight of the object being transported 1, and absorbs the kinetic energy of the object being transported 1 corresponding to the deformation amount 6 obtained by the sinking of the object being transported 1, thus moderating and reducing the transport speed. In addition to that, the friction resistance created by belt transmission operates as well, so that the transport speed of the object being transported 1 is moderated and reduced to a great degree as a result of the sum of the both.

As shown by the letter T in FIG. 10, when the same object being transported 1 is transported from the set of brake wheels 15 formed by the parallel stretching to the left-hand set of brake wheels 16 formed by the deceleration-type connection, a linear velocity of the belt-like brake material 17 of the left-hand set of brake wheels 16 is lower than a linear velocity of the belt of the set of brake wheels 15 formed by the parallel stretching as described. Accordingly, the object being transported 1 is rapidly decelerated as if braked suddenly. At this moment, the difference between the linear velocities of the two belts is absorbed due to a slip of either of the belts. Therefore, the distance e between the object being transported 1 located at a position shown by the letter T and a left-hand object being transported 1 proceeding ahead is increased. On the other hand, the distance f to the following object being transported 1 located at a position shown by the letter U is reduced.

However, in the case of assembly of the set of brake wheels 15 formed by the parallel stretching and the set of brake wheels 16 constructed by acceleration-type connection as in an embodiment shown in FIG. 12, an opposite operation is obtained.

Specifically, in the set of brake wheels 16 constructed by the acceleration-type connection, as illustrated in FIG. 13, two belt-like brake materials 17, 17 are each wound around a middle wheel 41 so as to contact a pulley portion 41c formed in an original outer circumferential surface 41a of the wheel and to protrude to form a diameter larger than the outer circumferential surface of the pulley portion 41c. One of the belts 17 is wound around a wheel on the right in FIG. 12 so as to stretch parallel, thereby constructing a set of brake wheels 15. The other belt-like brake material 17 is wound around a rotation-transmitting portion 4b with a smaller diameter, which is formed in a left-hand brake wheel 6 (see the embodiment 1), thereby constructing an acceleration-type set of brake wheels 16.

Concretely, a rotational peripheral speed of the left-hand brake wheel 6 constructing the acceleration-type set of brake wheels 16 is increased in inverse proportion to a diameter difference between the pulley portion 41c and the rotation-transmitting portion 4b with a smaller diameter. For this reason, at the stage where the object being transported 1 is transported from the right-hand set of brake wheels 15 formed by the parallel stretching onto the left-hand acceleration-type set of brake wheels 16, and is put upon and contact the brake wheel 6, the transport speed of the object being transported 1 is rapidly increased. As a result, the distance to an object being transported that proceeds ahead is decreased, and the distance to the following object being transported is increased.

As a consequence, if the conveyor is fabricated by assembling the sets of brake wheels 15, 16 and 18 and the brake wheel 6 in many different ways, it is possible to carry out brake control in various ways.

The invention, although an embodiment thereof is not illustrated, is based on an idea that one or more wheels 4 or rollers 10 selected among a group of wheels or rollers constructing a wheel or roller conveyor that transports the object being transported 1 by gravitational operation are integrally molded from rubber or plastic material that is soft and high in rebound resilience to be suitable for a brake material; more specifically, the materials listed in TABLE 2 as suitable for the brake material, directly by an injection-molding method or the like, and that the integrally molded material is disposed in a proper place of the conveyor to use as a brake wheel or brake roller.

Alternatively, the invention is based on an idea of using the brake wheel or brake roller molded from an elastomeric material having a rubber hardness HS (JIS A) of 90 degree or less and a rebound resilience (JIS K7311) of 85 percent or less.

According to this invention, it should be understood without much explanation that operation and advantages provided by the brake wheel or brake roller thus constructed are the same as those explained in descriptions about the embodiment 1.

The construction in which the brake material or belt-like brake material is fitted to the ring-like groove having a width corresponding to part of the width of the outer circumferential surface of the wheel or roller of the invention may have a wheel formed in a bilayer including elastomer that is soft and high in rebound resilience on the outer circumferential surface of the wheel. A simple bilayer structure, however, causes the brake material portion made up of the elastomer portion to separate if compatibility of the wheel and the elastomer portion is not taken into account. Therefore, it is necessary to select materials in consideration of compatibility. For this reason, the ring-like component made up of elastomer is fitted into the groove of the wheel, to thereby prevent the brake material from being easily detached, and increase latitude in the selection of a target material regardless of compatibility. It is possible to fabricate the wheel having the function of the brake material by integral molding of a bilayer structure or by interfitting the ring-like brake material in the groove of the wheel afterwards.

When the conveyor according to the invention is utilized in a field in which electric components are involved, it is necessary to protect the object being transported from an electric shock caused by electrostatic charge. Therefore, the wheel or roller and the brake material or belt-like brake material are made up of antistatic rubber or plastic having a volume resistivity of $10^{12}$ or less. In general, rubber or plastic that is an insulating body is added with carbon black and thus has conductivity. If the conductivity is increased, the carbon black is required to be added accordingly, which reduces rebound resilience. Thus, it is difficult in the present circumstances to select elastomer suitable for an electrically conductive brake material. To the contrary, plastic provides a larger choice than elastomer does. Therefore, the brake material or belt-like brake material is formed into the shape of a ring having width corresponding to part of width of the outer circumferential surface of the wheel or roller so that the brake material portion is compressed when an object is loaded upon the wheel or roller, and the object is brought into contact with the outer circumferential surface of the wheel. As a consequence, the electrostatic charge is released from the wheel even if the antistatic function of the brake material portion is low.

Although the present invention has been described above with reference to the illustrated embodiments, needless to say, the invention is not limited to the constructions of the above embodiments. In addition to the aforementioned by way of precaution, the present invention may be variously embodied in terms of design changes and applications that those skilled in the art would make, without deviating from the gist and technical idea of the invention.

BRIEF DESCRIPTION OF THE DRAWINGS

FIG. 3 is an elevation view showing the brake wheel, partially broken away;

FIGS. 4A-4C are views for explaining operation and advantages of the wheel conveyor;

Figure 1:
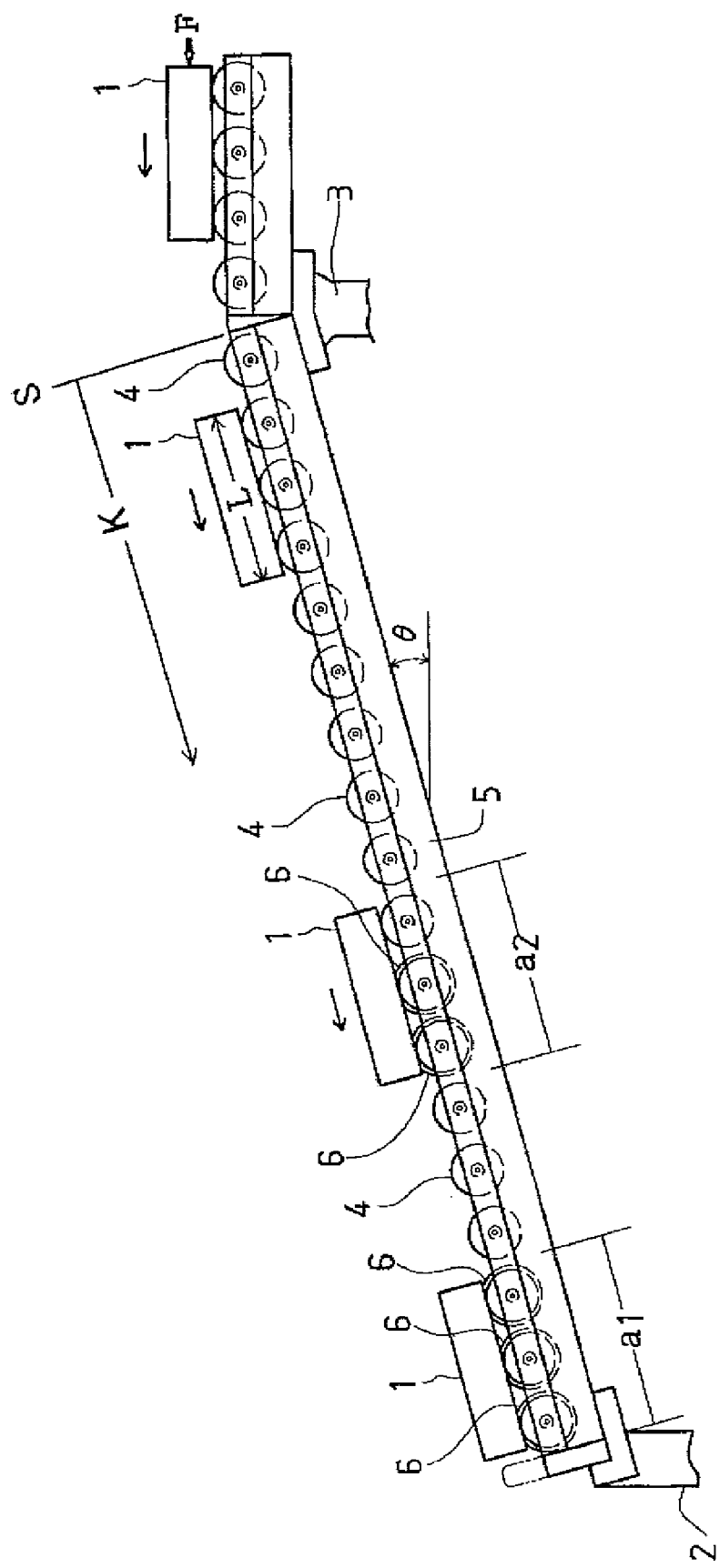
FIG. 1 is a side view showing an embodiment of a wheel conveyor according to the present invention in a state of being used.
Figure 2:
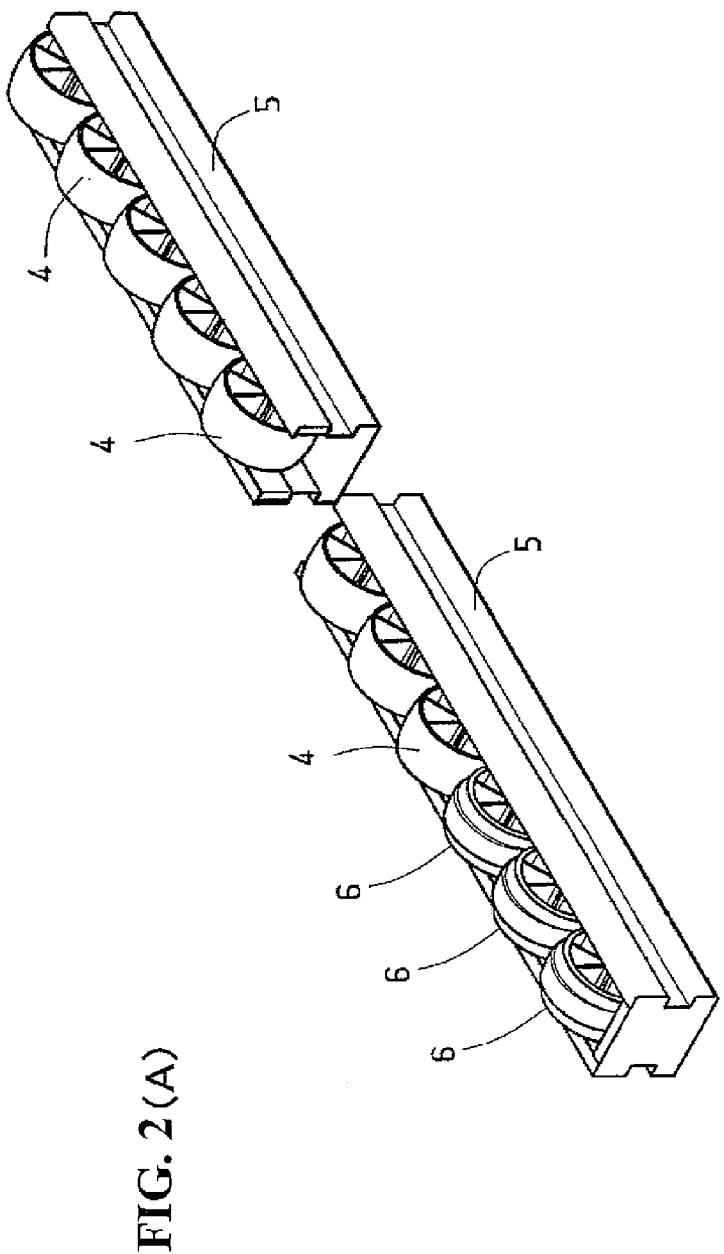
FIG. 2A is a perspective view of the wheel conveyor.
FIG. 2B is a perspective view of a brake wheel.
Figure 2:
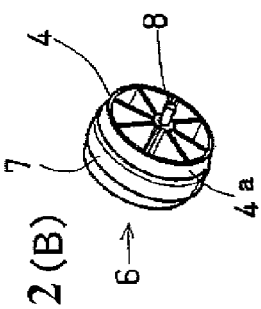
Figure 5A:
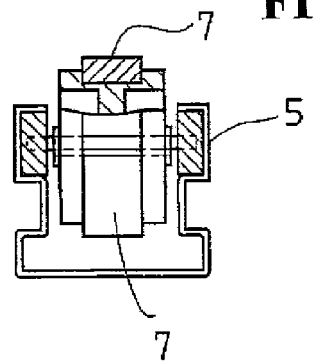
FIGS. 5A-5E are elevation views showing examples of different constructions of the brake wheel, partially broken away.
Figure 5D:
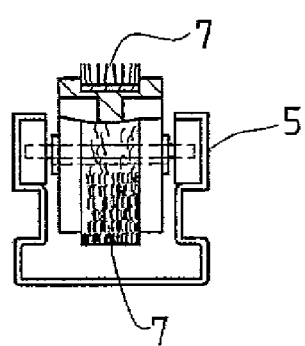
Figure 5B:
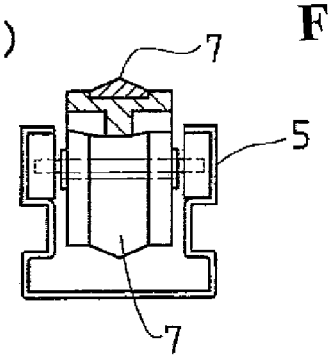
Figure 5E:
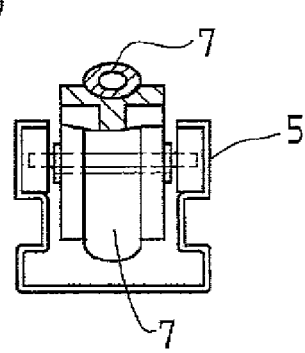
Figure 5C:
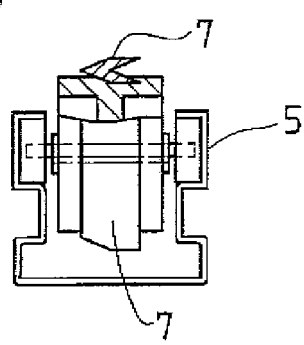
Figure 6:
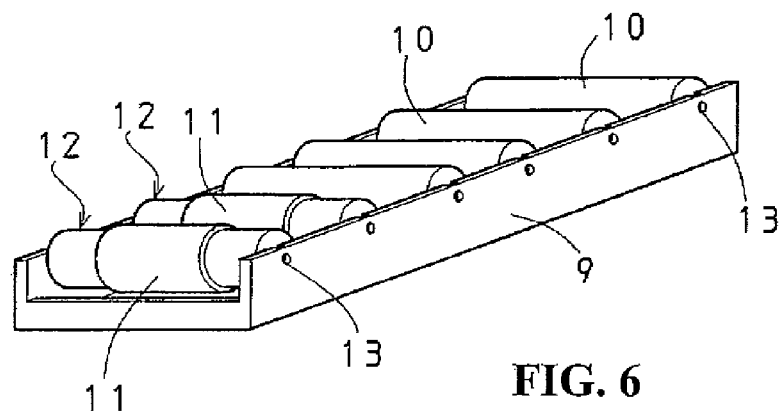
FIG. 6 is a perspective view showing an embodiment of a roller conveyor.
Figure 7:
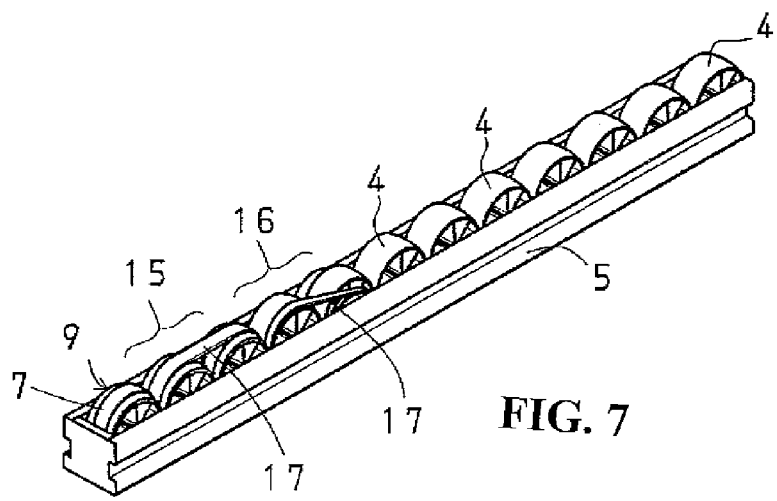
FIG. 7 is a perspective view showing another embodiment of the wheel conveyor according to the present invention.
Figure 8:
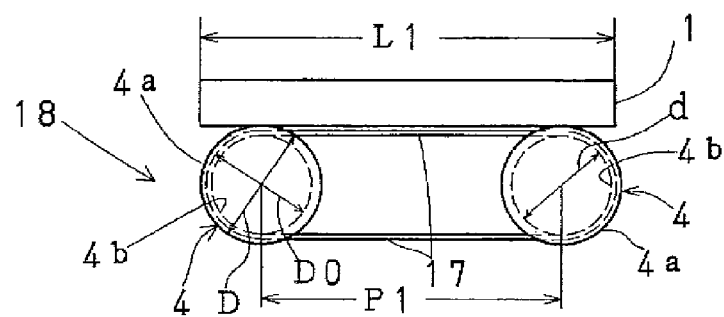
FIG. 8 is an elevation view for explaining an embodiment and operation of a set of brake wheels.
Figure 9:
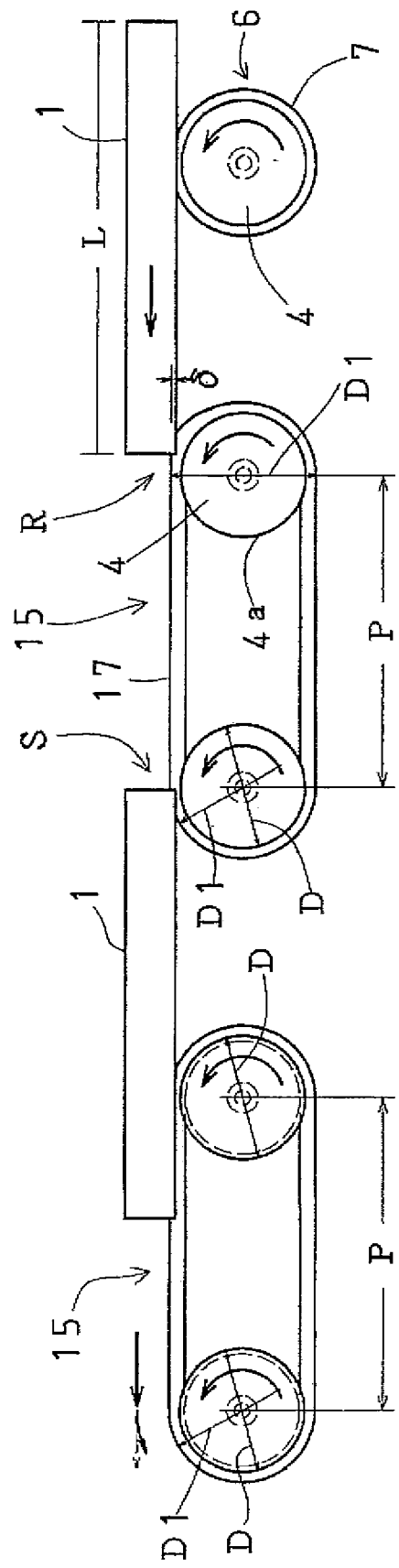
FIG. 9 is an elevation view for explaining the operation of a parallel-type set of brake wheels.
Figure 10:
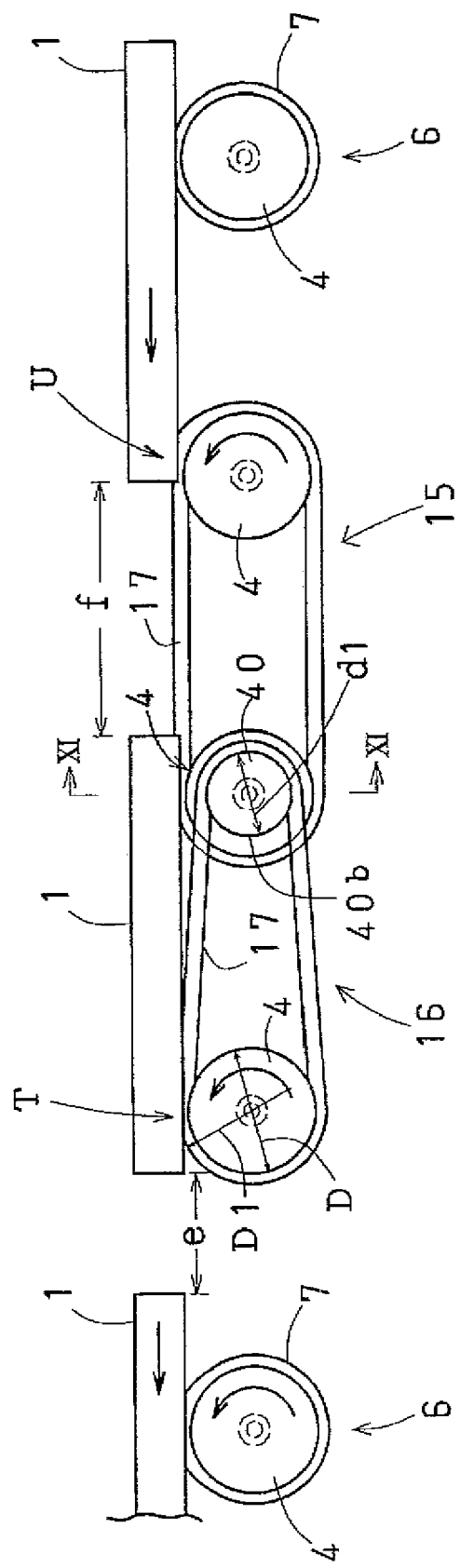
FIG. 10 is an elevation view for explaining an embodiment, operation and advantages of a deceleration-type set of brake wheels.
Figure 11:
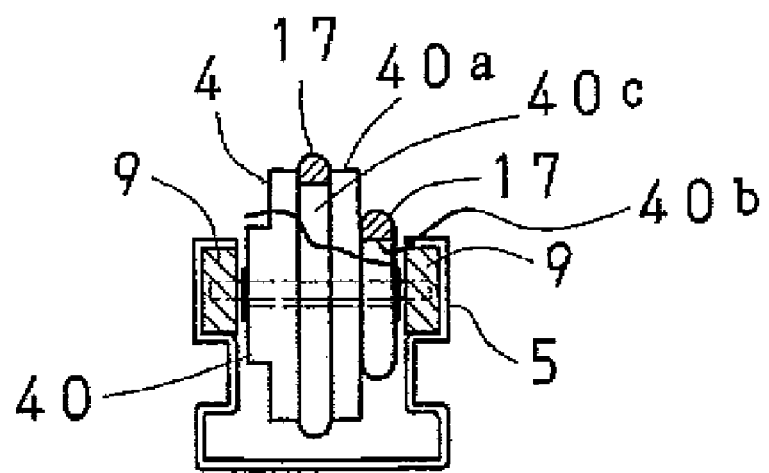
FIG. 11 is a sectional view, taken along line XI-XI of FIG. 10.
Figure 12:
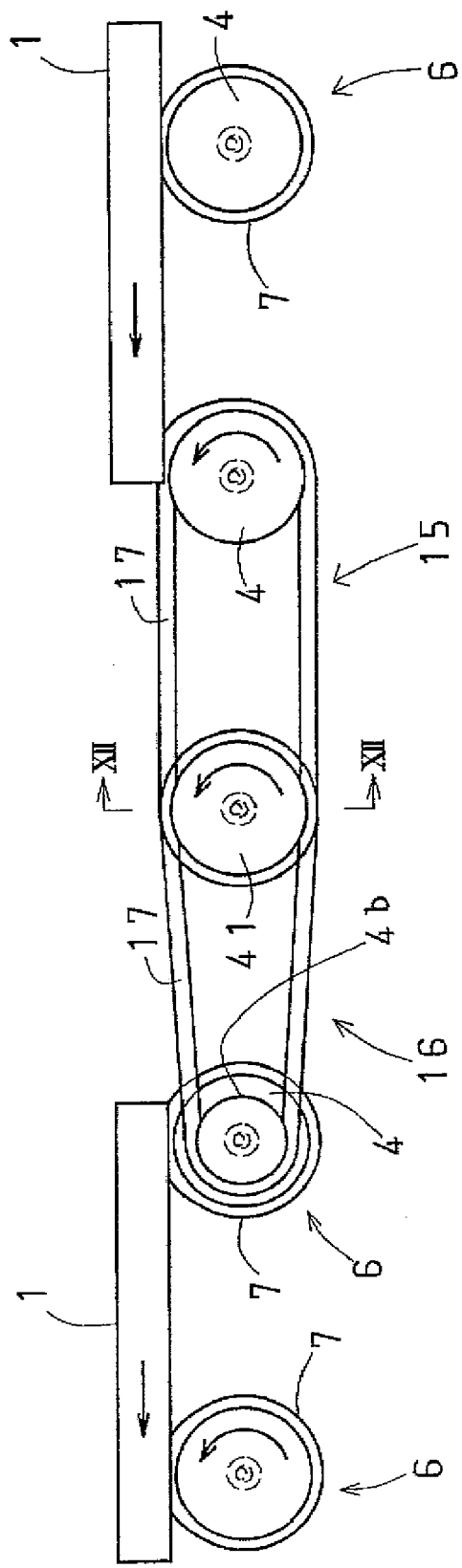
FIG. 12 is an elevation view for explaining an embodiment, operation and advantages of an acceleration-type set of brake wheels.
Figure 13:
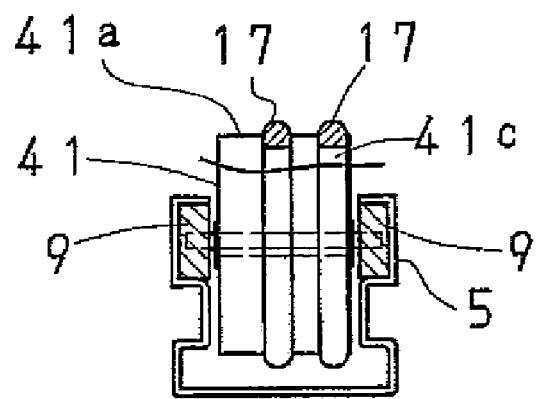
FIG. 13 is a sectional view, taken along line XII-XII of FIG. 12.
Figure 14:
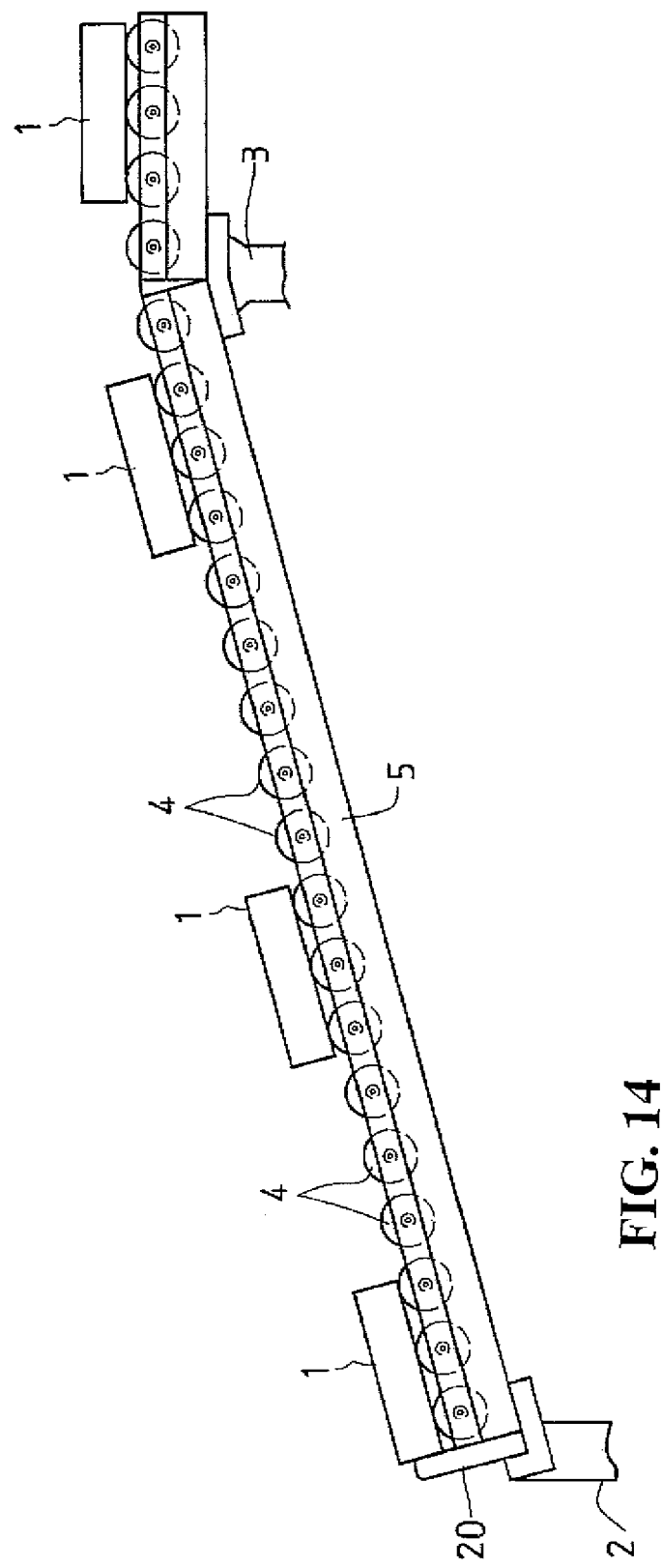
FIG. 14 is a side view showing a conventional wheel conveyor in a state of being used.

EXPLANATION OF REFERENCE NUMERALS 1 object being transported
4 wheel
4b, 40b rotation-transmitting portion
6 brake wheel
7, 11 brake material
10 roller
12 brake roller
17 belt-like brake material
20 stopper
5 conveyor frame
15, 16, 18 a set of brake wheels or brake rollers
4a outer circumferential surface of the wheel
D external diameter of the wheel
a1 position of the dead end of the conveyor
a2 position where the conveyor is required to decelerate
40 compound type wheel

The invention claimed is:

1. A gravity wheel or roller conveyor capable of brake control of an object being transported, which has a construction in which a plurality of freely rotatable wheels or rollers are arranged in a transporting direction of said object, and said object being transported is transported by gravitational operation thereof, said wheel or roller conveyor comprising:
    one or more selected wheels or rollers are constructed as brake wheels or brake rollers each having an outer circumferential surface onto which a brake material that has a bristle structure is fixed so as to protrude to form a diameter larger than an outer circumferential surface of each of said wheels or rollers.

2. A gravity wheel or roller conveyor capable of brake control of an object being transported, which has a construction in which a plurality of freely rotatable wheels or rollers are arranged in a transporting direction of said object, and said object being transported is transported by gravitational operation thereof, said wheel or roller conveyor comprising:
    at least two or more selected adjacent wheels or rollers are constructed as a set of brake wheels or brake rollers by winding a belt-like brake material therearound to be connected together,
    wherein said entire belt-like brake material or an outer circumferential surface portion therefore is formed of a material that is soft and high in rebound resilience, and said belt-like brake material is wound around said selected wheels or rollers in such a protruding position as to form A diameter larger than an outer circumferential surfaces of said selected wheels or rollers.

3. The gravity wheel or roller conveyor capable of brake control of an object being transported, claimed in claim 2, wherein the brake material or belt-like brake material has a bristle structure.

4. A gravity wheel or roller conveyor capable of brake control of an object being transported, which has a construction in which a plurality of freely rotatable wheels or rollers are arranged in a transporting direction of said object, and said object being transported is transported by gravitational operation thereof, said wheel or roller conveyor comprising:
    at least two or more selected adjacent wheels or rollers are constructed as a set of brake wheels or brake rollers by winding a belt-like brake material therearound to be connected together,
    wherein each of said selected wheels or rollers is provided with a rotation-transmitting portion having a diameter smaller than an original outer circumferential surface thereof, and said set of brake wheels or brake rollers is constructed by winding one end of said belt-like brake material around said rotation-transmitting portion having a smaller diameter, and winding the other end of said belt-like brake material around an original outer circumferential surface portion of an adjacent wheel or roller in such a protruding position as to form a diameter larger than said outer circumferential surface thereof.

5. The gravity wheel or roller conveyor capable of brake control of an object being transported, claimed in claim 4, wherein the brake material or belt-like brake material has a bristle structure.

6. A gravity wheel or roller conveyor capable of brake control of an object being transported, which has a construction in which a plurality of freely rotatable wheels or rollers are arranged in a transporting direction of said object and said object being transported is transported by gravitational operation thereof, said wheel or roller conveyor comprising:

at least two or more selected adjacent wheels or rollers are constructed as a set of brake wheels or brake rollers by winding a belt-like brake material therearound to be connected together, wherein said set of brake wheels or brake rollers is constructed by providing each of said brake wheels or brake rollers with a rotation-transmitting portion having a diameter smaller than an original outer circumferential surface thereof and winding said belt-like brake material around said rotation-transmitting portions having smaller diameters formed in two adjacent wheels or rollers so as not to protrude from original outer circumferential surfaces of said wheels or rollers.

7. The gravity wheel or roller conveyor capable of brake control of an object being transported, claimed in claim 6 wherein the brake material or belt-like brake material has a bristle structure.

* * * * *